United States Patent [19]

Lihrmann

[11] Patent Number: 5,404,976
[45] Date of Patent: Apr. 11, 1995

[54] ASSEMBLY OF FREE WHEELS IN TANDEM WITH A SINGLE CENTRAL BEARING

[75] Inventor: Vincent Lihrmann, Mantes-la-Jolie, France

[73] Assignee: SKF France, Clamart, France

[21] Appl. No.: 154,080

[22] Filed: Nov. 18, 1993

[30] Foreign Application Priority Data

Dec. 2, 1992 [FR] France .................. 92 14509

[51] Int. Cl.[6] ............................................. F16D 41/06
[52] U.S. Cl. ................................ 192/48.92; 192/45
[58] Field of Search .............. 192/48.92, 45, 41 R, 192/50

[56] References Cited

U.S. PATENT DOCUMENTS

| 1,929,782 | 10/1933 | Hughes | 192/48.92 |
|---|---|---|---|
| 2,427,120 | 9/1947 | Blair | 192/48.92 X |
| 3,310,997 | 3/1967 | Biddle | 192/50 X |
| 3,712,431 | 1/1973 | Versoy | 192/48.92 X |
| 4,284,183 | 8/1981 | Brisabois et al. | 192/48.92 |
| 4,645,047 | 2/1987 | Adolfsson | 192/45.1 X |
| 4,693,351 | 9/1987 | Adolfsson | 192/48.92 |
| 4,928,801 | 5/1990 | Laurent | 192/45.1 |
| 5,024,308 | 6/1991 | Kinoshita et al. | 192/45 X |
| 5,109,964 | 5/1992 | Fukui et al. | 192/48.92 |
| 5,139,123 | 8/1992 | Rutke | 192/45.1 |
| 5,156,245 | 10/1992 | Fujiwara et al. | 192/45.1 X |
| 5,222,582 | 6/1993 | Castens | 192/48.92 X |

FOREIGN PATENT DOCUMENTS

| 903251 | 9/1945 | France . | |
|---|---|---|---|
| 2618195 | 1/1989 | France . | |
| 3307824 | 9/1984 | Germany | 192/48.92 |
| 224347 | 11/1968 | U.S.S.R. | 192/48.92 |
| 264853 | 6/1970 | U.S.S.R. | 192/48.92 |
| 0779683 | 11/1980 | U.S.S.R. | 192/48.92 |

Primary Examiner—Andrea L. Pitts
Attorney, Agent, or Firm—Beveridge, DeGrandi, Weilacher & Young

[57] ABSTRACT

An assembly of free wheels in tandem has an external cylindrical sliding raceway and an internal cylindrical sliding raceway, two rows of jamming cams evenly spaced between the external and internal sliding raceways in the circumferential direction and held in the form of a ring by means of an alveolate cage, and associated lateral bearings. The assembly includes a single central bearing common to both free wheels and interposed axially between the two rows of jamming cams. The central bearing includes a radial central web in the form of a substantially planar washer, and an internal and external rim with at least one part of each rim being folded over axially so as to form a bearing surface intended to come into contact with a corresponding sliding raceways. For one bearing surface of the external rim of the central bearing extending in a given axial direction, there is a bearing surface on the internal rim extending in the opposite axial direction.

20 Claims, 3 Drawing Sheets

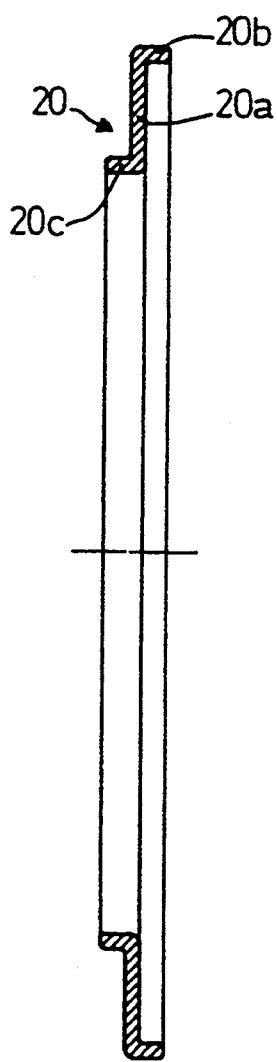
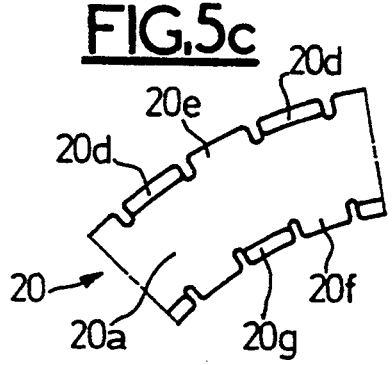
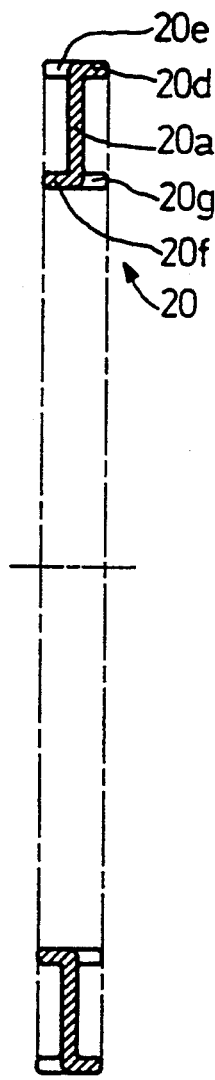
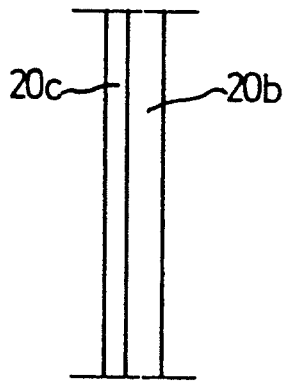
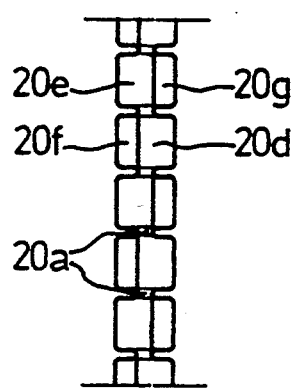

ASSEMBLY OF FREE WHEELS IN TANDEM WITH A SINGLE CENTRAL BEARING

BACKGROUND DISCUSSION

The present invention relates to an assembly of free wheels in tandem, including at least two free wheels with jamming cams and bearings associated with the free wheels, all of the jamming cams and bearings being housed between external and internal sliding raceways.

One free wheel is intended to transmit a one-way torque mechanically between two mechanical components through the use of the sliding raceways forming part of the said mechanical components and of the jamming cams. The associated bearings are intended to provide correct relative centering of the external and internal sliding raceways and withstand radial loads between the external and internal sliding raceways. The operating principle of an assembly of free wheels is known, particularly from French Patent 2,618,195 (SKF).

According to the definitions attributed in the field of the art in question, an actual free wheel includes a plurality of jamming cams evenly spaced in the circumferential direction and held in the form of a ring by means of an alveolate cage of annular overall shape. The cams are designed to interact with the external and internal sliding raceways so as to transmit a mechanical torque by jamming the said cams between the two sliding raceways when these are given a relative rotational movement in a given direction, and no longer to transmit a torque if the direction of relative rotation is reversed (making it act as a free wheel). The alveolate cage is also intended to receive one or more elastic members, for example in the form of an annular strip-shaped spring, which exert(s) on the jamming cams a return torque in the direction promoting their jamming between the external and internal sliding raceways.

The bearings are components of annular overall shape including a radial web in the overall shape of a washer equipped with two axial rims, an external rim and an internal rim, which are intended to bear respectively on the external and internal sliding raceways. Such types of free wheels are used, for example, in automatic gearbox mechanisms for vehicles.

In some applications, it may be necessary to use pairs of free wheels mounted in tandem, that is to say axially side by side, it being possible for the external sliding raceways or the internal sliding raceways to be machined in a common component or in two distinct components mounted axially adjacent to one another. The use of an assembly with two free wheels in tandem, axially side by side, may be justified by the need to allow a high torque to pass, whilst using free wheels of "standard" dimensions; in other words, when the mechanical torque to be transmitted exceeds the mechanical transmission capacity of a single free wheel of so-called standard dimension, two free wheels of standard dimensions are assembled in tandem instead of using one free wheel with very wide jamming cams, the manufacture of which is a special order, and costly. It may also be necessary to use such tandem assemblies of free wheels when it is desired to transmit to one and the same member, mechanical torques coming from two neighbouring, but distinct, coaxial mechanical components.

To date, the assembly, in tandem, of free wheels comes from a simple axial association of two free wheels, each one equipped with two lateral bearings. The axial positioning of the lateral bearings of each free wheel is provided by means of a radial shoulder formed in the mechanical components including the sliding raceways and by means of added circlips held in annular grooves machined in the said components.

Such a conventional assembly of free wheels in tandem certainly gives entire satisfaction from the mechanical point of view, but it exhibits certain drawbacks owing to the relatively large number of assembled elements, which implies high manufacturing costs for the assembly, difficulties in handling the elements and in assembling them, and a large axial size of the tandem assembly.

SUMMARY OF THE INVENTION

The object of the present invention is to overcome the aforementioned drawbacks with the aid of an assembly of free wheels in tandem, of simple design and compact structure.

According to the invention, the assembly of free wheels in tandem has external and internal cylindrical sliding raceways arranged coaxially, two rows of jamming cams evenly spaced between the external and internal sliding raceways in the circumferential direction, each row being held in the form of a ring by means of an alveolate cage, and bearings associated with the jamming cams and arranged between the external and internal sliding raceways.

According to the invention, between the two rows of jamming cams, there is a single central bearing common to both free wheels. The central bearing, interposed axially between the two free wheels of the assembly includes a radial central web in the form of a substantially plane washer. At least part of each rim of the central web is folded over axially so as to form a bearing surface intended to come into contact with the corresponding sliding raceways. In addition, for any bearing surface located at the external rim of the central web and orientated in a given axial direction, there is a bearing surface on the internal rim of the central web orientated in an opposite axial direction.

According to one embodiment of the invention, the radial central web of the central bearing is provided with two, internal and external, rims extending axially in opposite directions. The rims may be in the form of a continuous cylindrical bearing surface or of axial tabs which are distributed circumferentially in a uniform fashion.

This embodiment may advantageously be used for applications in which the external and internal sliding raceways are produced on monobloc mechanical components.

According to another embodiment of the invention, the radial central web has at least one rim folded so as to form axial tabs forming a bearing surface of alternating direction, and which are distributed circumferentially in a uniform fashion.

This embodiment is advantageously used for applications in which the external and/or internal sliding raceways are produced on distinct components, it thus being possible for the corresponding bearing surface to be produced on both axially adjacent sliding raceways at once.

By virtue of the invention, an assembly of free wheels in tandem is obtained with a reduced number of elements to be assembled (less bearings and less circlips), less machining operations on the mechanical components possessing sliding raceways (because less annular grooves for the circlips), and a reduced axial size, which may lead either to less bulky and therefore more compact assemblies, or to an increased capacity of the assembly as regards taking up torque if it is decided to use the space made available between the two rows of cams to increase the widths of the jamming cams.

BRIEF DESCRIPTION OF THE DRAWINGS

The invention will be better understood from studying the detailed description of two embodiments taken by way of non-limiting example and illustrated by the appended drawings, in which:

FIG. 4a is an axial section of the central bearing of the assembly according to the first embodiment of the invention;

FIG. 4b is a partial view in the radial direction from the outside of the central bearing of FIG. 4a;

FIG. 5a is an axial section of the central bearing of the assembly according to the second embodiment of the invention;

FIG. 5b is a partial view in the radial direction from the outside plane of the central bearing according to FIG. 5a; and FIG. 5c is a partial view in the axial direction of the central bearing of FIG. 5a.

DETAILED DESCRIPTION OF THE PREFERRED EMBODIMENTS

Figure 1:
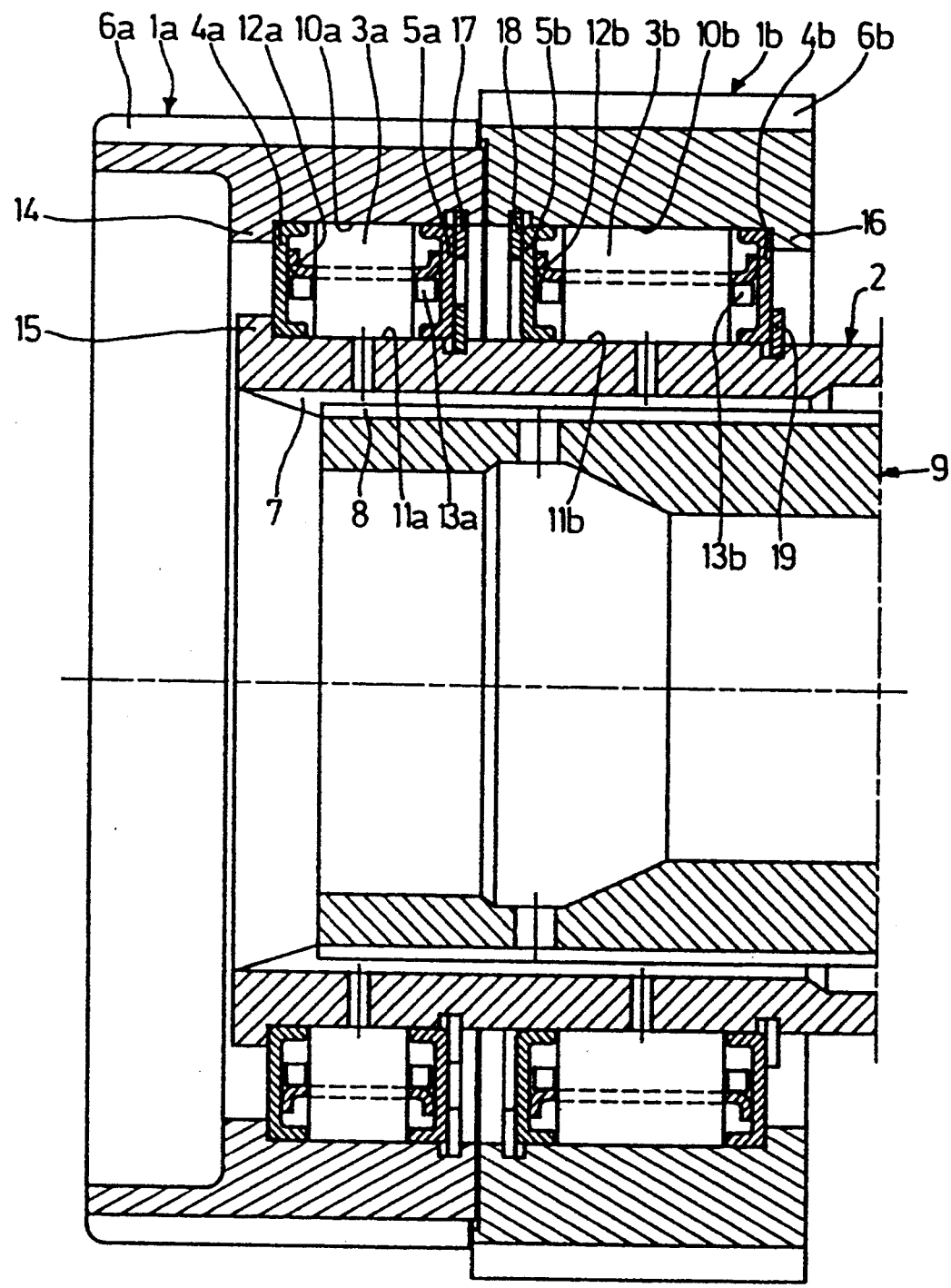
FIG. 1 is an axial section of an assembly of free wheels in tandem according to the conventional art.

As illustrated in FIG. 1, the assembly of free wheels in tandem comprises two external races 1a and 1b mounted axially side by side, a common internal race 2, two rows of jamming cams 3a, 3b, lateral bearings 4a, 5a and 4b, 5b. The external races 1a and 1b are mechanically coupled, through the use of teeth or splines 6a, 6b distributed circumferentially on the outside of the said races, to external mechanical members or gears, which are not represented. The internal race 2 has a tubular portion provided with internal axial splines 7 uniformly distributed circumferentially and which are mechanically coupled to external axial splines 8 of a cylindrical shaft 9 arranged coaxially inside the internal race 2.

The external races 1a and 1b each have an internal cylindrical surface 10a, 10b which forms external sliding raceways for the corresponding row of jamming cams 3a, 3b. Likewise, the external surface of the internal race 2 offers two cylindrical parts 11a, 11b forming internal sliding raceways for the rows of jamming cams 3a, 3b.

Each row of jamming cams 3a, 3b consists of a plurality of jamming cams evenly spaced in the circumferential direction between the external sliding raceway 10a, 10b and internal sliding raceway 11a, 11b, and held in the form of a ring by means of an alveolate cage 12a, 12b. Each cage 12a and 12b also accommodates a strip-shaped spring 13a, 13b which exerts, on the jamming cams 3a, 3b, a mechanical return torque in the direction promoting their jamming between the external sliding raceways 10a, 10b and internal sliding raceways 11a, 11b. Thus, a mechanical torque may be transmitted by the assembly of free wheels in tandem between the external mechanical members, which are not represented, interacting with the teeth or splines 6a, 6b of the external races 1a and 1b of the assembly, and the shaft 9 interacting with the internal race 2 of the assembly.

To provide relative centering between the external sliding raceway 10a, 10b and internal sliding raceway 11a, 11b, and to withstand the radial loads between the said sliding raceway, the conventional solution consists in using a pair of lateral bearings 4a, 5a or 4b, 5b for each row of jamming cams 3a or 3b. The lateral bearings are produced in annular form with U-shaped cross-section and are positioned partially with the aid of the radial shoulders 14, 15, 16 in the external and internal races of the assembly, and of the circlips 17, 18, 19 interacting with annular grooves in the external and internal races. Between the two rows of jamming cams 3a, 3b are therefore two lateral bearings 5a, 5b and their positioning circlips 17, 18, these bearings and circlips being spaced apart axially. As a result, there is quite a large axial spacing between the two rows of jamming cams 3a and 3b. Indeed, it is necessary not only to take account of the size of the two lateral bearings 5a, 5b and their associated positioning circlips 17 to 18, but also of an axial spacing between the said positioning circlips 17, 18 between the rows of jamming cams 3a, 3b.

Figure 2:
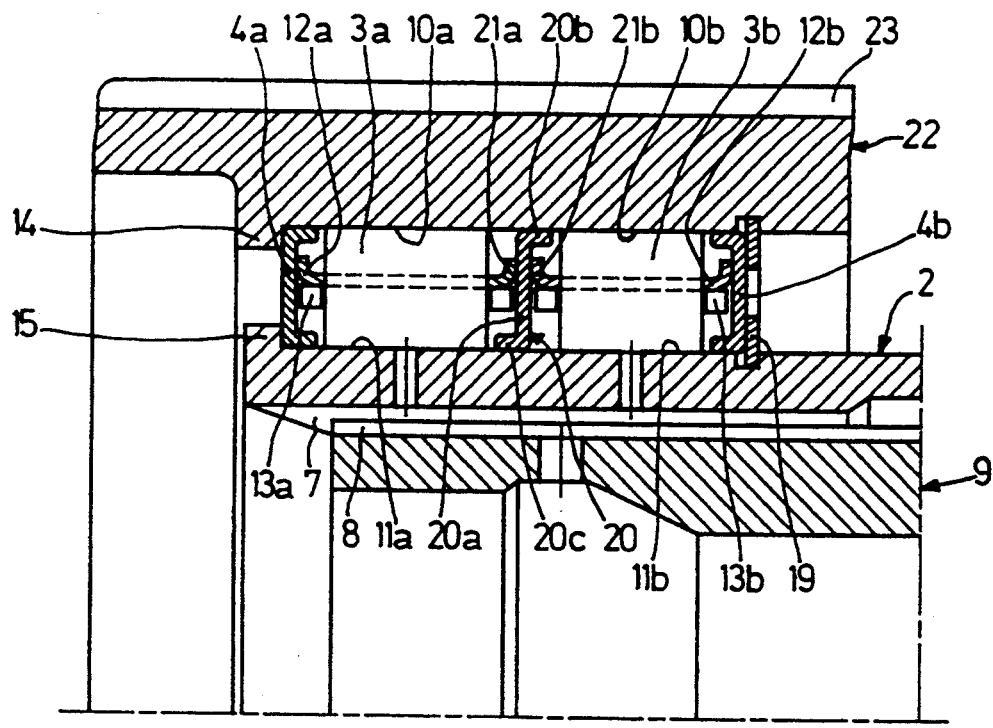
FIG. 2 is a partial axial section of an assembly of free wheels in tandem according to a first embodiment of the invention.

As illustrated in FIGS. 2 et seq., the present invention proposes to resolve this problem by producing a central bearing 20 which is common to both rows of jamming cams 3a, 3b and is interposed axially between these two rows. The central bearing 20 may be produced preferably from a tape of steel or copper-based alloy sheet metal by cutting and stamping without removing the chips. The central bearing comprises a radial central web 20a in the form of a substantially plane washer at least a part of each rim of which is folded over axially so as to form a bearing surface intended to come into contact with the corresponding sliding raceway 10a, 10b; 11a, 11b.

According to the first embodiment of the invention, as illustrated in FIGS. 2, 4a and 4b, the central bearing 20 has a radial central web 20a, an external rim folded in the axial direction to form an external cylindrical bearing surface 20b pointing in a given direction (to the right according to the drawings), and an internal rim folded to form a cylindrical bearing surface 20c pointing in the direction opposite the external rim 20b (to the left according to the drawings). In the example given, the annular central bearing 20 has a symmetry of revolution with the external rim 20b and internal rim 20c constituting cylindrical axial bearing surfaces. It is equally possible to envisage producing the external 20b and/or internal 20c rims in the form of a plurality of axial tabs evenly distributed circumferentially on the central bearing 20.

The cages 12a and 12b of the two rows of jamming cams 3a, 3b each have a flank 21a, 21b pressing elastically on the two radial faces of the central web 20a of the central bearing 20, which also contributes to the axial positioning of the central bearing 20 with respect to the jamming cams 3a and 3b.

In comparison with the conventional solution illustrated in FIG. 1, the invention makes it possible to reduce considerably the axial separation between the two rows of jamming cams 3a and 3b, which, for an identical axial size makes it possible to increase considerably the total width of the two rows of jamming cams 3a and 3b.

This results in an improvement in the mechanical torque transmission capacity of the assembly of free wheels in tandem.

In the variant illustrated in FIG. 2, the external race 22, provided with external coupling teeth or splines 23 is common to both free wheels in the same way as the common internal race 2.

Figure 3:
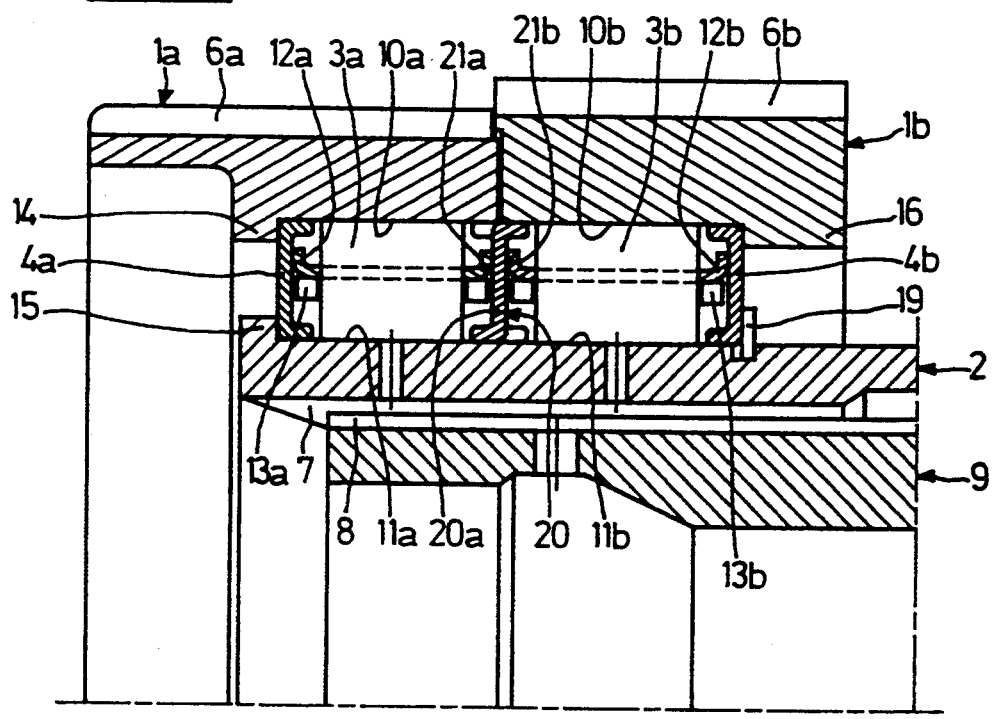
FIG. 3 is a partial axial section of an assembly of free wheels in tandem according to a second embodiment of the invention.

In the variant illustrated in FIG. 3, the tandem assembly carries two external races 1a and 1b, as the case illustrated in FIG. 1. The central bearing 20 includes a radial central web 20a in the form of a substantially plane washer with the external rim and the internal rim, which form a bearing surface, produced in the form of alternating axial tabs extending in opposite directions.

As can be seen in more detail in FIGS. 5a, 5b, 5c, the external rim of the annular central bearing 20 consists of the alternating axial tabs 20d and 20e extending in opposite directions and coming into contact with the external sliding raceways 10a and 10b. Likewise, the internal rim of the central bearing 20 has alternating axial tabs 20f, 20g extending in opposite directions and forming a bearing surface for the internal sliding raceways 11a and 11b of the internal race 2.

In the example illustrated, the axial tabs 20d and 20e of the external rim of the central bearing 20 are distributed over circular paths of the same diameter. The same is the case for the axial tabs 20f and 20g of the internal rim of the central bearing 20.

It is also possible to envisage, within the scope of the invention, that for the external races 1a and 1b which have sliding raceways 10a and 10b of different diameter, the external rim of the central bearing 20 has axial tabs, which form a bearing surface 20d which are orientated in a direction distributed on a circular path, the diameter of which is different from the diameter for the axial bearing surface tabs 20e of the opposite direction. This also applies for the case in which the internal sliding raceways 11a and 11b have different diameters. In this case it is sufficient to provide internal axial tabs 20f and 20g forming a bearing surface, along two circular paths of different diameter.

What is claimed is:

1. Assembly of free wheels in tandem, comprising external cylindrical sliding raceways (10a, 10b) and internal cylindrical sliding raceways (11a, 11b), two rows of jamming cams (3a, 3b) spaced between the external and internal sliding raceways in circumferential direction and each held in ring form by means of a respective alveolate cage (12a, 12b), and associated lateral bearings (4a, 4b), said assembly of free wheels further comprising a single central bearing (20) common to both free wheels and interposed axially between the two rows of jamming cams (3a, 3b), said central bearing including a radial central web (20a) in the form of a washer and an internal and external rim, and at least one part of each of said rims is folded over axially so as to form a bearing surface intended to come into contact with a corresponding one of said sliding raceways (10a; 10b or 11a, 11b), and that for one bearing surface (20b; 20d) of the external rim of the central bearing extending in a given axial direction, there is a bearing surface (20c; 20f) on the internal rim extending in an opposite axial direction.

2. Assembly of free wheels in tandem according to claim 1, wherein at least one of the external and internal rims of the central bearing (20) is folded so as to form axial tabs forming a bearing surface (20d, 20e; 20f, 20g).

3. Assembly of free wheels in tandem according to claim 2, wherein the axial tabs extend in alternately opposing axial directions and are distributed on a circular path of a common diameter.

4. Assembly of free wheels in tandem according to claim 2, wherein a first group of axial tabs positioned on one of said rims extend in a first axial direction and are distributed along a circular path of a first diameter and wherein a second group of axial tabs positioned on said one of said rims and extending in an axial direction opposite said first axial direction are distributed along a circular path having a diameter which is different from said first diameter.

5. Assembly of free wheels in tandem according to claim 1, wherein the external rim (20b) and internal rim (20c) of the central bearing are folded to form cylindrical bearing surfaces orientated axially in opposite directions.

6. Assembly of free wheels in tandem according to claim 1, wherein at least one of the external and internal rims of the central bearing is folded so as to form an axial bearing surface comprised of axial tabs evenly spaced in a circumferential direction.

7. Assembly of free wheels in tandem according to claim 1, wherein the alveolate cages (12a, 12b) each have a flank (21a, 21b) pressing on two opposite faces of the radial central web (20a).

8. Assembly of free wheels in tandem according to claim 1, wherein the central bearing (20) is formed from a sheet metal blank with the bearing surfaces being formed without removing sheet metal material from said blank.

9. Assembly of free wheels in tandem according to claim 2, wherein said internal and external rims each include a plurality of said tabs orientated axially in opposite directions.

10. Assembly of free wheels in tandem according to claim 2, wherein said external rim features a plurality of said axial tabs orientated axially in opposite directions and wherein a first set of said axial tabs on said external rim extending in a first common direction are arranged along a first external circumference and a second set of said axial tabs on said external rim extending in a common direction opposite said first common direction are arranged along a second external circumference which is of a different diameter than said first circumference.

11. Assembly of free wheels in tandem according to claim 10, wherein said internal rim features a plurality of said axial tabs oriented axially in opposite directions, and wherein a first set of said axial tabs on said internal rim extending in a first common direction are arranged along a first internal circumference and a second set of said axial tabs on said internal rim extending in a common direction opposite said first common direction are arranged along a second internal circumference having a diameter different than that of said first internal circumference.

12. Assembly of free wheels in tandem according to claim 1, wherein said internal rim features a plurality of said axial tabs oriented axially in opposite directions, and wherein a first set of said axial tabs on said internal rim extending in a first common direction are arranged along a first internal circumference and a second set of said axial tabs on said internal rim extending in a common direction opposite said first common direction are arranged along a second internal circumference having a diameter different than that of said first internal circumference.

13. Assembly of free wheels in tandem according to claim 1, wherein said external cylindrical sliding raceways include a first cylindrical sliding raceway defined on an inner surface of a first external race (1a) and a second cylindrical sliding raceway defined on an inner surface of a second external race (1b) positioned adjacent said first external race.

14. Assembly of free wheels in tandem according to claim 1, wherein said external cylindrical sliding raceways are formed in spaced apart fashion on a common external race 15. Assembly of free wheels in tandem according to claim 7, further comprising strip shaped springs for biasing said alveolate cages, and said springs being positioned on opposite sides of said central bearing.

16. Assembly of free wheels in tandem according to claim 5, wherein the alveolate cages (12a, 12b) each have a flank (21a, 2b) pressing on two opposite faces of the radial central web (20a).

17. Assembly of free wheels in tandem according to claim 6, wherein said tabs are arranged in serial fashion about said at least one of the external and internal rims with every other one of said tabs extending in a common axial direction which is opposite an axial direction in which immediately adjacent tabs extend.

18. Assembly of free wheels in tandem according to claim 14, wherein said internal cylindrical slideways are formed on a common internal race (22).

19. An assembly of free wheels in tandem, comprising:
an external race having a pair of external sliding raceways formed thereon;
an internal race positioned radially internally of said external race and having a pair of internal sliding raceways formed thereon;
two rows of jamming cams spaced between said external and internal sliding raceways;
a first and second alveolate cage for holding a respective row of said jamming cams between said external and internal sliding raceways;
a central bearing common to both freewheels being interposed axially between the two rows of jamming cams and said central bearing including a radial central web, an internal rim and an external rim, wherein at least one part of each rim extends axially with respect to the radial central web to form a bearing surface which contacts a corresponding raceway, and wherein at least a part of said internal rim extends in an opposite axial direction than at least a part of said external rim.

20. An assembly as recited in claim 19 wherein said external race includes two distinct external race components mounted axially adjacent one another.

* * * * *